United States Patent Office 2,957,800
Patented Oct. 25, 1960

2,957,800

NEMATOCIDAL COMPOSITION COMPRISING AMIDES OF DIHALOPROPIONIC ACIDS

Thomas R. Hopkins, Joplin, Mo., Ralph P. Neighbors, Miami, Okla., and Otto L. Hoffmann, Pittsburg, Kans., assignors to Spencer Chemical Company, a corporation of Missouri No Drawing. Filed Dec. 14, 1956, Ser. No. 628,218

22 Claims. (Cl. 167—30)

This invention relates to novel chemical compounds and processes of preparing the same. More particularly, this invention relates to novel derivatives of alpha, beta-dihalopropionic acid and the use of such compounds against nematodes.

There are provided by this invention novel compounds of the formula

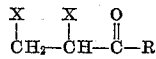

wherein X is a bromine or chlorine and R is a member selected from the group consisting of piperidino, morpholino, pyrrolidino, isoindolino, 1,2,3,4-tetrahydroisoquinolino, 1,2,3,4-tetrahydroquinolino, tetrahydroisoindolino, piperazino, N-alkylpiperazino, 3-hydroxypiperidino and 4-hydroxypiperidino radicals, and —NHR$_1$ and —N(R$_1$)R$_2$, wherein R$_1$ and R$_2$ are lower alkyl groups, lower alkylene groups, aryl groups, polynuclear groups, aryl lower alkyl groups, cycloalkyl groups. Representative compounds of the above formula are those in which R$_1$ and R$_2$ are lower alkyl or substituted lower alkyl groups such as methyl, ethyl, propyl, isobutyl, hexyl, octyl and the like; aryl and substituted aryl groups such as phenyl, halophenyl, lower alkoxyphenyl, nitrophenyl, biphenylyl and phenylazophenyl; alkene groups such as allyl; polynuclear such as naphthyl; aryl lower alkyl groups such as benzyl and phenylethyl.

Compounds such as described have activity against nematodes in plants and animals. These compounds may be produced conveniently by at least one of the following procedures:

In one procedure a reactive alpha, beta-dihalopropionyl halide is reacted with the appropriate substituted amine. This reaction may be represented as follows:

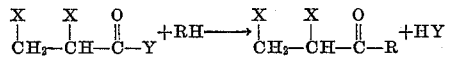

wherein Y is a reactive halogen such as chlorine, and X and R have the significance previously assigned.

The reaction is ordinarily effected by contacting the reactants in the presence of a suitable inert liquid reaction medium such as benzene or toluene. Generally, excess amine is provided to combine with the acid liberated during the reaction; however, other acid receptors such as pyridine may also be used. The reactants are vigorously agitated during the reaction. The resulting amide is recovered from the reaction mixture by conventional procedures such as filtration and distillation.

Another procedure for producing the amides is to contact an alpha, beta-dihalopropionic acid with a primary amine in the presence of phosphorus trichloride. An intermediate phosphazo compound forms which reacts with the acid to form the desired amide. This reaction may be represented as follows:

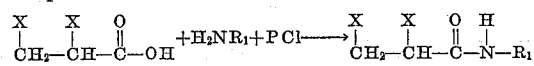

wherein X and R$_1$ have the significance previously assigned.

This phosphazo type reaction may be effected using the conditions mentioned above in regard to the acid halide method.

Representative compounds falling within the scope of this invention that may be so produced are N-methyl-alpha, beta-dichloropropionamide, N-ethyl-alpha, beta-dichloropropionamide, N-propyl-alpha, beta-dichloropropionamide, N-phenyl-alpha, beta-dichloropropionamide, N-cyclohexyl-alpha, beta-dichloropropionamide, N-naphthyl-alpha, beta-dichloropropionamide, N,N-dimethyl-alpha, beta - dichloropropionamide, N,N - diethyl-alpha, beta-dichloropropionamide, N,N-dipropyl-alpha, beta-dichloropropionamide, N,N-diphenyl-alpha, beta-dichloropropionamide, N-(alpha, beta-dichloropropionyl) piperidine, N-(2-chlorophenyl)-alpha, beta-dichloropropionamide, N-(2,4-dichlorophenyl)-alpha, beta-dichloropropionamide, N-(2,4,6-trichlorophenyl)-alpha, beta-dichloropropionamide, N-(4-methylphenyl)-alpha, beta-dichloropropionamide, N-(4-methoxyphenyl)-alpha, beta-dichloropropionamide, N-(4-nitrophenyl)-alpha, beta-dichloropropionamide, N-(4-phenylazophenyl)-alpha, beta-dichloropropionamide, N-(alpha, beta-dichloropropionyl)morpholine, N-(alpha, beta-dichloropropionyl)pyrrolidine, and the corresponding alpha, beta-dibromopropionamides.

As has been indicated above, these substituted amides are active against nematodes in animals and plants.

Nematodes are non-segmented worms found in the soil, in plant life and in animal life, including the hookworm, pinworm, roundworm, trichina, gapeworm, Guinea worm and whipworm. The term "nematode" as used herein is intended to include all forms through which nematodes pass in a life cycle, such as eggs, larvae and adults.

Plant nematodes or eelworms range in length from less than one-sixty-fourth of an inch to about one-eighth of an inch. Plant nematodes are found in all soils in which plants will grow, and consequently every major crop is a potential victim of this pest. The annual damage as either directly or indirectly incurred from nematodes may be as great as three billion dollars.

Since the first steps to control nematodes by a chemical treatment in 1881 employing carbon disulfide, there has not been a material introduced which was entirely satisfactory. Even the most promising compounds which have become commercially available provide inadequate control and are expensive, toxic to animals, and phytotoxic to many plants as well.

When used at the recommended nematocidal rates in the treatment of plant nematodes in soils, these compounds are not phytotoxic. Since the compounds are not appreciably volatile at low temperatures, in contrast to other commercially available nematocides, they are very easy to apply with the ordinary type of spray or dusting equipment. Their low volatility provides a persistence after application which insures a more thorough and prolonged exposure of the chemical to the nematodes.

Many of these compounds have low mammalian toxicity, in which the LD$_{50}$ in rats (orally) is greater than 2000 mg./kilogm. Application of the compounds to soils is safe since amounts which may be acquired on contact during handling will not have a deleterious effect against animals.

The following test procedures were employed in evaluating the compounds:

*Contact tests.*—Water suspensions of the test chemicals were prepared in the concentration series of 500, 50, 5 and 0.5 p.p.m. Each concentration was placed in a separate quadrant of a Felsen dish or in a separate stoppered test tube. Freshly hatched larvae were then added to each quadrant or test tube. After 24 hours, and again after 7 days, the contents of each quadrant or test tube were observed through a microscope. If a significant percentage kill was obtained, the dead nematodes were counted and the percentage kill recorded as compared with the control containing no chemical. If all of the nematodes were killed in each quadrant of the Felsen dish the test was repeated with each concentration in separate dishes.

*Pot test.*—Water suspensions of the test chemicals were prepared in concentrations corresponding to 100 lbs. and 10 lbs. per acre. Four inch clay pots were filled with a soil which was infested with the nematode. The chemical suspension was then applied to the soil surface, and after one week, tomato seedlings were placed in the pots. After 6–8 weeks, the plants were removed and observed for the presence of nematode damage.

*Fumigation test.*—This method consists of placing the nematode larvae in sand in contact with the chemical in sealed jars for 24 hours. The nematodes were then decanted and examined for viability. The results of the test represent the effect of both fumigation and contact.

The results of these tests which were performed with some of the novel substituted amides of alpha, beta-dihalopropionic acid are included below for comparison.

Water may be preferred as the carrier because it is widely available and inexpensive. For those compounds which are partially or essentially insoluble in water, however, there should be included in the composition a surface active agent which will provide a homogeneous mixture from which the active nematocidal compound will not settle out rapidly. The surface active agent may be ionic or non-ionic and may be a liquid or solid. Typical satisfactory surface active agents which may be used are alkali metal-higher alkylarylsulfonates such as sodium dodecylbenzenesulfonate, fatty alcohol sulfates such as the sodium salts of the monoesters of sulfuric acid with n-aliphatic alcohols containing 8–18 carbon atoms, sodium salts of alkylnaphthalenesulfonic acids, long chain quaternary ammonium compounds, sodium salts of petroleum-derived alkylsulfonic acids, polyoxyethylene sorbitan mono-oleate and alkylaryl polyether alcohol. An adjuvant liquid may also be included in such compositions. Such liquid may be either soluble or insoluble in water and may be any solvent such as an alcohol, benzene, toluene, kerosene, or hexane, which aids in solubilizing or dispersing the active nematocidal agent in water.

NEMATOCIDAL ACTIVITIES OF N-SUBSTITUTED-ALPHA, BETA-DIHALOPROPIONAMIDES $$CH_2\text{-}CH\text{-}C\text{-}R$$
$$\phantom{CH_2\text{-}}|\phantom{CH\text{-}}|\phantom{C\text{-}}\|$$
$$\phantom{CH_2\text{-}CH\text{-}C\text{-}R}X\phantom{CH}X\phantom{C}O$$

| | | Contact Test: Lowest Effective Concentration (p.p.m.) (7 days) | Fumigation Test: Lowest Effective Concentration (p.p.m.) (c) and/or (d) | Pot Test [b] |
|---|---|---|---|---|
| 1 | R= —NHR₁, R₁=alkyl, X=chlorine<br>N-ethyl-alpha, beta-dichloropropionamide | c 500 | | 100% control @ 100#/Acre. |
| | R= —NHR₁, R₁=aryl, X=chlorine<br>N-phenyl-alpha,beta-dichloropropionamide | a 50 | 10 | 75% control @ 100#/Acre. |
| | N-(2-chlorophenyl)-alpha,beta-dichloropropionamide | a 50 | 10 | |
| | N-(3-chlorophenyl)-alpha,beta-dichloropropionamide | a 50 | 100 | |
| | N-(4-chlorophenyl)-alpha,beta-dichloropropionamide | c 50  a 0.5 | 1 | 99% control @ 100#/Acre.<br>80–90% control @ 31#/Acre. |
| 2 | N-(2,4-dichlorophenyl)-alpha,beta-dichloropropionamide | c 5 | 10 | 99% control @ 100#/Acre.<br>Some control @ 10#/Acre. |
| | N-(2,4,6-trichlorophenyl)-alpha,beta-dichloropropionamide | c 500 | | |
| | N-(4-bromophenyl)-alpha,beta-dichloropropionamide | c 5 | 100 | |
| | N-(4-nitrophenyl)-alpha,beta-dichloropropionamide | c 50 | | 80% control @ 100#/Acre. |
| | N-(4-methylphenyl)-alpha,beta-dichloropropionamide | c 5 | 100 | 90% control @ 100#/Acre.<br>70% control @ 10#/Acre. |
| | N-(4-methoxyphenyl)-alpha,beta-dichloropropionamide | c 50 | 100 | |
| | N-(4-phenylazophenyl)-alpha,beta-dichloropropionamide | c 5 | 10 | 99% control @ 100#/Acre. |
| 3 | R= —N(R₁)R₂, R₁ and R₂=alkyl, X=chlorine<br>N,N-diethyl-alpha,beta-dichloropropionamide | c 500 | | 60% control @ 100#/Acre. |
| 4 | R= —NHR₁, R₁=polynuclear group, X=chlorine<br>N-(2-naphthyl)-alpha,beta-dichloropropionamide | c 500 | | 60% control @ 100#/Acre. |
| 5 | R= —NHR₁, R₁=cycloalkyl, X=chlorine<br>N-cyclohexyl-alpha,beta-dichloropropionamide | c 50 | | 100% control @ 100#/Acre. |
| 6 | R=N-heterocyclic group, X=chlorine<br>N-(alpha,beta-dichloropropionyl)piperidine | c 500 | | 60% control @ 100#/Acre. |

[a] Ditylenchus.
[b] Meloidogyne.
[c] Panagrellus.
[d] Rhabditus.

The optimum rate of application will depend upon the type of plant as well as such factors as pH of the soil, soil condition, climatic conditions, and the particular nematode type present. We have found, however, that excellent control, without danger of phytotoxicity, is exhibited at a dosage of about 100 lbs. per acre in the control of the Meloidogyne species.

The application of the novel substituted amides to soils is readily achieved by the use of novel concentrates and compositions contained this compound as the active ingredient. To achieve a suitable dispersion on soils it is most convenient to employ compositions in which an amide is combined with an inert carrier or diluent. The carrier may be a solvent which will dissolve the active agent. It also may be a solvent which will not dissolve the compound, for suitable dispersions are also effective. Such compositions may be sprayed on the soil. Solid carriers, particularly powders of either organic or mineral composition, are also suitable for use in the compositions. Some such solid carriers are talc, clay and pulverized limestone. Dust is a convenient way to apply such powdered compositions.

Concentrated compositions containing the active nematocidal agent which may be subsequently diluted, as with water, to the desired concentration for application to soil are also provided. The advantages of such concentrates are that they are prepared by the manufacturer in a form such that the user need only mix them with a locally available carrier, preferably water, thereby keeping shipment costs to a minimum while providing a product which may be used with a minimum of equipment and effort. Such concentrates may contain about 50% or more of the active nematocidal agent with a carrier or diluent, which may be a solid or liquid. Liquid carriers which either dissolve the active agent or other liquids in which this compound may be suspended may be used. A wetting or surface active agent is also generally included to facilitate such dilution or dispersion in water. However, the wetting agent itself may comprise the carrier in such concentrates.

Wettable powdered concentrates are prepared by mixing the active nematocidal agent with an inert solid diluent such as fuller's earth, bentonite or hydrated aluminum magnesium silicate and a wetting agent. One representative wettable powder has the composition:

| | Percent (wt.) |
|---|---|
| N-ethyl-alpha,beta-dichloropropionamide | 50 |
| Hydrated aluminum magnesium silicate | 40 |
| Sodium alkylnaphthalenesulfonate | 7 |
| Ligninsulfonate | 2 |
| Methyl cellulose | 1 |

A wettable powder such as this when mixed with water forms a dispersion which is particularly suitable for spray application to the soil.

The following emulsifiable concentrate is particularly useful for high dilution rates:

| | Percent (wt.) |
|---|---|
| N - (4 - chlorophenyl) - alpha,beta - dichloropropionamide | 30 |
| Triton X-151: blend of an alkylaryl polyether alcohol and organic sulfonate | 10 |
| Atlas CIPC emulsifier: a polyoxyethylene fatty ester | 10 |
| Cyclohexanone | 25 |
| Xylene | 25 |

As previously indicated above the amides may be used against nematocides in animals. Although the pure compounds may be administered alone, it is preferable to administer them in combination with a pharmaceutical carrier which may be either a suitable liquid or solid. Solid pharmaceutical carriers such as starch, sugar, talc and the like may be used to form powders. The powders may be used as such or be tableted or be used to fill capsules. Suitable lubricants like magnesium stearate, binders such as gelatin and disintegrating agents like sodium carbonate in combination with citric acid may be used to form the tablets.

A typical tablet may have the composition:

| Composition— | Mg. |
|---|---|
| (1) N - (4 - nitrophenyl) - alpha,beta - dichloropropionamide | 10 |
| (2) Starch U.S.P | 57 |
| (3) Lactose U.S.P | 73 |
| (4) Talc U.S.P | 9 |
| (5) Stearic acid | 6 |

Powders 1, 2 and 3 are slugged, then granulated, mixed with 4 and 5, and tableted.

Tablets may also be made from the following ingredients from the stated quantities:

| | | |
|---|---|---|
| (1) N - cyclohexyl - alpha,beta - dichloropropionamide | grams | 2000 |
| (2) Lactose U.S.P | do | 800 |
| (3) Dibasic calcium phosphate U.S.P | do | 1527.2 |
| (4) Starch U.S.P | do | 799.3 |
| (5) Calcium stearate | do | 56.7 |
| (6) Gelatin solution—lb./gal.H₂O | | 1.5 |

Powders 1, 2 and 4 are granulated, using enough gelatin solution to wet the mixture. The granules are then combined with the other ingredients, gelatin solution is added to wet the mixture, and it is tableted. The size of the tablets may be varied at will although tablets of 0.25 to 0.50 gm. are quite satisfactory for many uses.

Capsules are prepared by filling No. 3 hard gelatin capsules with the following ingredients, thoroughly mixed:

| | Mg. |
|---|---|
| (1) N-methyl-alpha,beta-dibromopropionamide | 15 |
| (2) Lactose U.S.P | 200 |
| (3) Starch U.S.P | 16 |
| (4) Talc U.S.P | 8 |

Administration to large numbers of animals, especially small animals, may be readily effected by adding the active nematocidal agent to the drinking water or a feedstuff for the animals. To introduce the active agent in a feedstuff it is convenient to employ a premix in which the agent is first mixed with an inert carrier such as ground oyster shells, attapulgus clay, distiller's dried grains or edible vegetable substances and the premix subsequently thoroughly dispersed in the feedstuff.

For treating nematodes in animals a concentration of at least 0.1% by weight in the feedstuffs is preferred although lower concentrations give some control. Unit-dosage forms such as tablets and capsules, however, may contain a minimum of about 2 mg. of the active nematocidal compound and usually a maximum of 100 mg. per kilogram of body weight of the animal being treated. Unit-dosages may contain as little as 1 mg. for small animals and as much as 10,000 mg. for large animals. The general unit-dosage forms, however, contain about 5–300 mg. of active agent. The weight of the active agent in the unit dosages may comprise up to about 80–90% or more of the total weight.

The degree of activity of these amides is shown by the fact that at 316 p.p.m., N-(4-chlorophenyl)-alpha, beta-dichloropropionamide gave 100% kill of Strongyl larvae (horse) on a direct contact test.

The following examples illustrate the preparation of certain of the novel susbtituted amides of alpha, beta-dihalopropionic acid.

*Example 1.—N-ethyl-alpha, beta-dichloropropionamide*

A 500 ml. flask equipped with thermometer, mechanical stirrer, dropping funnel and condenser, was immersed in a waterbath at room temperature. It was charged with 16.1 grams (0.1 mole) of alpha, beta-dichloropropionyl chloride (B.P. 43–46° C. at 16 mm. Hg) and 200 ml. benzene. 9.0 grams (0.2 mole) of ethylamine dissolved in 50 ml. of benzene was added dropwise with stirring during a period of 15 minutes. Temperature of the reaction mixture rose 15° C. during the addition. After filtering off the ethylamine hydrochloride, the filtrate was diluted with 700 ml. of petroleum ether. The slurry was chilled and filtered, producing 11.8 grams (69% yield) of crude product, M.P. 97–98° C. A portion of the crude product was treated with Norit A and recrystallized from a mixture of benzene and n-hexane; this material was further recrystallized from a mixture of benzene and ligroin and air dried, and melted at 98.5–99.5° C.

*Analysis.*—Calculated for $C_5H_9Cl_2NO$: C, 35.3%; H, 5.3%. Found: C, 35.5%; H, 5.3%.

The alpha, beta-dichloropropionyl chloride used in this example was prepared as follows:

130 grams (0.91 mole) of alpha, beta-dichloropropionic acid was charged to a 500 ml. flask equipped with a heating mantle, reflux condenser and calcium chloride dryer. 131.9 grams (1.1 moles) of thionyl chloride was added to the acid and the mixture refluxed four hours. The reaction mixture was then vacuum distilled at 16 mm. Hg through a 24″ packed column; the fraction boiling at 43–46° C. was removed for this and subsequent reactions.

*Example 2.—N-(4-chlorophenyl)-alpha, beta-dichloropropionamide*

255 grams (2.0 moles) of 4-chloroaniline, and 2 liters of benzene was introduced into a 3-liter flask. Agitation was started and 167 grams (1.0 mole) of alpha, beta-dichloropropionyl chloride was added dropwise. After addition of the acid chloride, the mixture was refluxed for 3 hours while maintaining vigorous agitation. The 4-chloroaniline hydrochloride was removed by filtration and the hot filtrate was diluted with 3 liters of n-hexane. After cooling to room temperature and filtering, 210.0 grams of crude N-(4-chlorophenyl)-alpha, beta-dichloropropionamide was obtained. Recrystallization from a benzene-n-hexane mixture gave 189.4 grams of product (M.P. 125–127° C.) which represented a conversion of 75% based upon the acid chloride. A portion of the latter product was treated again with Norit A, recrystallized three times from a benzene-hexane mixture and dried; M.P. 129.0–129.5° C.

*Analysis.*—Calcd. for $C_9H_8Cl_3NO$: C, 42.8%; H, 3.2%. Found: C, 43.0%; H, 2.9%.

*Example 3.—N-(4-chlorophenyl)-alpha, beta-dichloropropionamide*

510 grams (4.0 moles) of 4-chloroaniline, 286 grams of alpha, beta-dichloropropionic acid (2.0 moles) and 3.0 liters of toluene were introduced into a 5-liter flask. The flask was equipped with a reflux condenser, a dropping funnel, a mechanical stirrer, and a heater. Agitation was started and a solution of 110 grams (0.8 mole) of phosphorus trichloride in 500 milliliters of toluene was added dropwise over a period of 30 minutes. After the phosphorus trichloride addition, the mixture was heated to reflux temperature and held for 4 hours while maintaining vigorous agitation. The 4-chloroaniline hydrochloride was removed by filtration, and the hot filtrate diluted with 5 liters of n-hexane. After cooling to room temperature, 205.0 grams of N-(4-chlorophenyl)-alpha, beta-dichloropropionamide (M.P. 123–125° C.) was obtained by filtration. Subsequent chilling of the filtrate to 0° C. yielded a second crop weighing 62.2 grams (M.P. 116–122° C.). Both crops of crude product were combined and recrystallized from a mixture of benzene and n-hexane, using Norit A to decolorize the hot solution. A final yield of 222.3 grams of N-(4-chlorophenyl)-alpha, beta-dichloropropionamide (M.P. 125–127° C.) was obtained which represented a conversion of 55% based upon the phosphorus trichloride.

*Example 4.—N-cyclohexyl-alpha, beta-dichloropropionamide*

32.3 grams (0.2 mole) of alpha, beta-dichloropropionyl chloride dissolved in 150 ml. of chloroform was placed in a 500 ml. flask equipped with mechanical stirrer and dropping funnel. 39.6 grams (0.4 mole) of cyclohexylamine (B.P. 131.5–132.5° C. at 1 atm.) dissolved in 50 ml. of chloroform was added dropwise and the accompanying reaction maintained below 30° C. by the use of an ice bath. The reaction mixture was stirred for an additional hour after completion of the reaction, whereupon the precipitate of cyclohexylamine hydrochloride was filtered off and discarded. 16.2 grams of crude amide was precipitated from the filtrate by the addition of hexane and subsequent cooling. The crude amide was washed twice with water and recrystallized twice from a mixture of ethanol and water to yield N-cyclohexyl-alpha, beta-dichloropropionamide, M.P. 124–126° C.

*Analysis.*—Calcd. for $C_9H_{15}Cl_2NO$: C, 48.2%; H, 6.8%. Found: C, 48.0%; H, 6.4%.

*Example 5.—N-(2-naphthyl)-alpha, beta-dichloropropionamide*

19.4 grams (0.12 mole) of alpha, beta-dichloropropionyl chloride was added with stirring to 17.2 grams (0.12 mole) of beta-naphthylamine which had been dissolved previously in about 250 ml. of hot toluene contained in a 600 ml. beaker. Upon completion of the reaction, the mixture was cooled and the precipitated product collected, washed with water and recrystallized in about 500 ml. of 95% ethanol. 10 grams of N-(2-naphthyl)-alpha, beta-dichloropropionamide was produced melting at 174–176° C.

*Analysis.*—Calcd. for $C_{13}H_{11}Cl_2NO$: C, 58.2%; H, 4.1%. Found: C, 58.5%; H, 4.0%.

*Example 6.—N,N-diethyl-alpha, beta-dichloropropionamide*

14.6 grams (0.2 mole) of diethylamine in 50 ml. of benzene was added with stirring to 16.1 grams (0.1 mole) of alpha, beta-dichloropropionyl chloride in 100 ml. of benzene contained in a 400 ml. beaker. The temperature of the reaction mixture rose from that of room temperature to about 60° C. during addition and, after stirring for an additional hour, the solid diethylamine hydrochloride was removed by filtration. The benzene was removed from the filtrate under reduced pressure, the residue filtered to remove a small amount of diethylamine hydrochloride, and the resulting filtrate vacuum distilled to yield 7.5 grams of the following fractions:

| | $n_D$ |
|---|---|
| (1) Up to 86.5° C. at 2 mm. Hg | 1.4778 at 20.5° C. |
| (2) 86.5° C. at 2 mm. Hg | 1.4778 |
| (3) 86.5–87.5 at 2 mm. Hg | 1.4796 |
| (4) 87.5–88.5 at 2 mm. Hg | 1.4810 |
| (5) 88.5–89.0 at 2 mm. Hg | 1.4814 |
| (6) 89.0 at 2 mm. Hg | 1.4818 |
| (7) 94.0 at 2 mm. Hg | 1.4823 |
| (8) 88.0 at 2 mm. Hg | 1.4823 |
| (9) 88.0 at 2 mm. Hg | 1.4823 |

*Analysis* (fraction 8.).—Calcd. for $C_7H_{13}Cl_2NO$: C, 42.4%; H, 6.6%. Found: C, 42.5%; H, 6.4%.

*Example 7.—N,N-diphenyl-alpha, beta-dichloropropionamide*

16.2 grams (0.1 mole) of alpha, beta-dichloropropionyl chloride in 50 ml. of benzene was added dropwise with stirring to 33.84 grams (0.2 mole) of diphenylamine, at room temperature, which had been dissolved in 250 ml. of benzene contained in a 500 ml. flask. The reaction mixture was stirred and refluxed for two hours. The reaction mixture was then filtered to remove a small amount of brown solid and the filtrate diluted with 1000 ml. of ligroin and cooled to −60° C. Since immediate crystallizaation was not apparent, the mixture was poured into an evaporating dish and allowed to remain for about a week. The crystals which were obtained were recrystallized from hexane and treated with Norit A to yield 7.4 grams of N,N-diphenyl-alpha, beta-dichloropropionamide, M.P. 88–89° C. A portion of this product was recrystallized from methanol and washed with several portions of petroleum ether; M.P. 89.5–90° C.

*Analysis.*—Calcd. for $C_{15}H_{13}Cl_2NO$: C, 61.2%; H, 4.5%. Found: C, 61.5%; H, 4.2%.

*Example 8.—N-(alpha, beta-dichloropropionyl) piperidine*

17.0 grams (0.2 mole) of piperidine dissolved in 50 ml. of benzene was added dropwise with stirring over a period of 15 minutes to 16.1 grams (0.1 mole) of alpha, beta-dichloropropionyl chloride (B.P. 43–46° C.) dissolved in 200 ml. of benzene contained in a 500 ml. flask immersed in a water bath at room temperature. Temperature of the reaction mixture rose about 12° C. during the addition; the mixture was stirred for an additional hour whereupon the precipitate of piperidine hydrochloride was removed by filtration. Benzene was removed from the filtrate by evaporation under reduced pressure to yield 16.2 grams (77.1% crude yield) of a light yellow oil. The oil was then refrigerated and the small amount of white solid which precipitated was removed by filtration. The remaining oil was vacuum distilled into the following four fractions:

| | $n_D$ |
|---|---|
| (1) 120–128° C. at 3.5 mm. Hg | 1.5077 at 21° C |
| (2) 128–131° C. at 3.5 mm. Hg | 1.5110 |
| (3) 127° C. at 2.25 mm. Hg | 1.5125 |
| (4) Temperature and pressure uncontrollable | 1.5130 |

*Analysis* (fraction 3).—Calcd. for $C_8H_{13}Cl_2NO$: C, 45.7%; H, 6.2%. Found: C, 45.9%; H, 6.5%.

*Example 9.—N-(4-biphenylyl)-alpha, beta-dichloropropionamide*

24.6 grams (0.146 mole) of 4-phenylaniline in 150 ml. of benzene was added dropwise with stirring to 11.8 grams (0.073 mole) of alpha, beta-dichloropropionyl chloride dissolved in 100 ml. of benzene at room temperature. It was necessary to add 500 ml. of additional benzene to improve the fluidity of the mixture. The mixture was stirred an additional two hours after final addition of reagents and filtered. The filtrate was diluted with hexane whereupon a product melting at 182–184° C. precipitated. This product was twice recrystallized from a mixture of benzene and hexane and melted at 183–184° C. A portion of this product was then recrystallized from a mixture of ethanol-methanol-water; M.P. 188–188.5° C.

*Analysis.*—Calcd. for $C_{15}H_{13}Cl_2NO$: C, 61.24%; H, 4.45%. Found: C, 61.3%; H, 4.2%.

What is claimed is:

1. A wettable powder for plant parasitic nematode control comprising an inert powdered solid carrier, a liquid surface active agent, and a compound of the formula

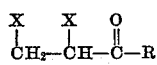

wherein X is a member of the group consisting of bromine and chlorine, and R is a member of the group consisting of piperidino, pyrrolidino, isoindolino, 1,2,3,4-tetrahydroisoquinolino, 1,2,3,4-tetrahydroquinolino, tetrahydroisoindolino, piperazino, N-alkylpiperazino, 3-hydroxypiperidino and 4-hydroxy piperidino radicals, —$NHR_1$ and —$N(R_3)R_2$, wherein $R_1$ is a member of the group consisting of phenylazophenyl, naphthyl, phenyl-lower alkyl, and biphenylyl, halophenyl, dihalophenyl, nitrophenyl groups, $R_2$ is a member of the group consisting of phenyl, nuclear substituted phenyl, lower alkyl, phenylazophenyl, naphthyl, phenyl-lower alkyl, and lower cycloalkyl groups, and $R_3$ is a member of the group consisting of phenyl, lower cycloalkyl groups and the groups represented by $R_1$.

2. The method of controlling plant parasitic nematodes which comprises applying a nematocidal amount of a compound of the formula

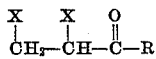

wherein X is a member of the group consisting of bromine and chlorine, and R is a member of the group consisting of piperidino, morpholino, pyrrolidino, isoindolino, 1,2,3,4-tetrahydroisoquinolino, 1,2,3,4-tetrahydroquinolino, tetrahydroisoindolino, piperazino, N-alkylpiperazino, 3-hydroxypiperidino and 4-hydroxypiperidino radicals, —$NHR_1$ and —$N(R_1)R_2$, wherein $R_1$ and $R_2$ are lower alkyl groups, lower alkene groups, monocarbocyclic aryl groups, naphthyl, nuclear substituted monocarbocyclic aryl groups, monocarbocyclic aryl-lower alkyl groups, and lower cycloalkyl groups, to plants and soils infested with plant parasitic nematodes.

3. The method of claim 2 in which 10 to 100 pounds per acre of compounds of the said formula are added to plants and soils infested with plant parasitic nematodes.

4. The method of killing plant parasitic nematodes which comprises applying a nematocidal amount of N-(4-chlorophenyl)-alpha, beta-dichloropropionamide to plants and soils infested with plant parasitic nematodes.

5. The method of killing plant parasitic nematodes which comprises applying a nematocidal amount of N-(4-phenylazophenyl)-alpha, beta-dichloropropionamide to plants and soils infested with plant parasitic nematodes.

6. The method of killing plant parasitic nematodes which comprises applying a nematocidal amount of N-phenyl-alpha-beta-dichloropropionamide to plants and soils infested with plant parasitic nematodes.

7. The method of killing plant parasitic nematodes which comprises applying a nematocidal amount of N-(2-chlorophenyl)-alpha, beta-dichloropropionamide to plants and soils infested with plant parasitic nematodes.

8. The method of killing plant parasitic nematodes which comprises applying a nematocidal amount of N-(3-chlorophenyl)-alpha, beta-dichloropropionamide to plants and soils infested with plant parasitic nematodes.

9. The method of killing plant parasitic nematodes which comprises applying a nematocidal amount of N-(2,4-dichlorophenyl)-alpha, beta-dichloropropionamide to plants and soils infested with plant parasitic nematodes.

10. The method of killing plant parasitic nematodes which comprises applying a nematocidal amount of N-(4-nitrophenyl)-alpha, beta-dichloropropionamide to plants and soils infested with plant parasitic nematodes.

11. The method of killing plant parasitic nematodes which comprises applying a nematodicad amount of N-(4-methylphenyl)-alpha, betadichloropropionamide to plants and soils infested with plant parasitic nematodes.

12. N-(4-phenylazophenyl)-alpha, beta-dichloropropionamide.

13. A nematocide composition comprising an inert carrier, a surface active agent and a member of the group consisting of a nematocidal compound of the formula

wherein X is a member of the group consisting of bromine and chlorine and R is a member of the group consisting of piperidino, pyrrolidino, isoindolino, 1,2,3,4-tetrahydroisoquinolino, 1,2,3,4-tetrahydroquinolino, tetrahydroisoindolino, piperazino, N-alkylpiperazino, 3-hydroxypiperidino and 4-hydroxypiperidino radicals, —$NHR_1$ and —$N(R_3)R_2$ wherein $R_1$ is a member of the group consisting of phenylazophenyl, naphthyl, phenyl-lower alkylene, halophenyl, dihalophenyl and nitrophenyl groups, $R_2$ is a member of the group consisting of phenyl, nuclear substituted phenyl, phenylazophenyl, naphthyl, phenyl-lower alkylene, lower cycloakyl and lower alkyl groups, and $R_3$ is a member of the group consisting of phenyl, lower cycloakyl, phenylazophenyl, naphthyl, phenyl-lower alkylene, biphenylyl, halophenyl, dihalophenyl and nitro-phenyl groups.

14. The composition of claim 13 in which the carrier is a powder.

15. The composition of claim 13 in which the carrier is water.

16. The composition of claim 13 in which the carrier is an organic liquid.

17. The composition of claim 13 in which the carrier is water and at least 50% by weight of the composition is the nematocidal compound.

18. The method of killing plant parasitic nematodes which comprises applying a nematocidal amount of N-(halophenyl)-alpha, beta-dichloropropionamide to plants and soils infested with plant parasitic nematodes.

19. The method of killing plant parasitic nematodes which comprises applying a nematocidal amount of N-(dihalophenyl)-alpha, beta-dichloropropionamide to plants and soils infested with plant parasitic nematodes.

20. A nematocidal composition comprising an inert carrier, a surface active agent and N-(halophenyl)-alpha, beta-dichloropropionamide.

21. A nematocidal composition comprising an inert carrier, a surface active agent and N-(dihalophenyl)-alpha, beta-dichloropropionamide.

22. A nematocidal composition comprising an inert carrier, a surface active agent and N-phenyl-alpha, beta-dichloropropionamide.

References Cited in the file of this patent

UNITED STATES PATENTS

| | | |
|---|---|---|
| 2,153,707 | Becherer et al. | Apr. 11, 1939 |
| 2,569,549 | Barrick | Oct. 2, 1951 |
| 2,636,816 | Stewart | Apr. 28, 1953 |
| 2,673,875 | Anspon | Mar. 30, 1954 |
| 2,754,322 | Anspon | July 10, 1956 |
| 2,851,494 | Ehrhart et al. | Sept. 9, 1958 |
| 2,877,154 | Hewitt et al. | Mar. 10, 1959 |

FOREIGN PATENTS

| | | |
|---|---|---|
| 743,302 | Great Britain | Jan. 11, 1956 |

OTHER REFERENCES

Chem. Abst., vol. 49, June-July 1955, pp. 6826i and 6827a.

Chem. Abst., vol. 21, 1927, p. 1446.

J.A.C., vol. 70, 1948, pp. 677–680.

Gertler: U.S. Dept. of Agri., Agri. Res. Service, ARS–33–31, October 1956, 10 pp.

UNITED STATES PATENT OFFICE
CERTIFICATION OF CORRECTION

Patent No. 2,957,800                      October 25, 1960

Thomas R. Hopkins et al.

It is hereby certified that error appears in the above numbered patent requiring correction and that the said Letters Patent should read as corrected below.

Column 1, line 70, for that portion of the formula reading "PCl" read -- $PCl_3$ --; column 3, in the Table, second column thereof, in compound 5, for "cyclohyexyl" read -- cyclohexyl --; line 63, for "contained" read -- containing --; column 5, line 27, for "nematocides" read -- nematodes --; column 8, line 41, for "crystallizaation" read -- crystallization --.

Signed and sealed this 2nd day of May 1961.

(SEAL)
Attest:

ERNEST W. SWIDER
Attesting Officer

DAVID L. LADD
Commissioner of Patents